United States Patent
Gao et al.

(10) Patent No.: US 12,526,425 B2
(45) Date of Patent: Jan. 13, 2026

(54) CCSO WITH BAND OFFSET ONLY OPTION

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 70 days.

(21) Appl. No.: 18/660,058

(22) Filed: May 9, 2024

(65) Prior Publication Data
US 2025/0126266 A1    Apr. 17, 2025

Related U.S. Application Data

(60) Provisional application No. 63/544,410, filed on Oct. 16, 2023.

(51) Int. Cl.
| | |
|---|---|
| *H04N 19/132* | (2014.01) |
| *H04N 19/124* | (2014.01) |
| *H04N 19/157* | (2014.01) |
| *H04N 19/167* | (2014.01) |
| *H04N 19/172* | (2014.01) |

(Continued)

(52) U.S. Cl.
CPC ......... *H04N 19/132* (2014.11); *H04N 19/124* (2014.11); *H04N 19/157* (2014.11); *H04N 19/167* (2014.11); *H04N 19/172* (2014.11); *H04N 19/184* (2014.11);

(Continued)

(58) Field of Classification Search
CPC ..... H04N 19/117; H04N 19/182; H04N 19/82
See application file for complete search history.

(56) References Cited

U.S. PATENT DOCUMENTS

| | | | |
|---|---|---|---|
| 2014/0177704 A1* | 6/2014 | Pu .......................... | H04N 19/86 375/240.02 |
| 2015/0195573 A1 | 7/2015 | Aflaki Beni et al. | |

(Continued)

OTHER PUBLICATIONS

Tencent America LLC, ISR/WO, PCT/US2024/030269, Aug. 27, 2024, 11 pgs.

(Continued)

*Primary Examiner* — Fabio S Lima
(74) *Attorney, Agent, or Firm* — Morgan, Lewis & Bockius LLP

(57) ABSTRACT

Various implementations described herein include methods and systems for coding video. In one aspect, a video bitstream includes a current image frame and a first syntax element. The first syntax element has a first predefined value that indicates that the band offset only mode is enabled to determine a first sample offset of a first color sample based on luma samples, independently of any associated luma gradient of the luma samples. When the band offset only mode is enabled, quantized values are generated based on the luma samples including a first luma sample collocated with the first color sample. A first color sample is classified based on the quantized values to determine the first sample offset of the first color sample. The current image frame is reconstructed at least by adjusting the first color sample based on the first sample offset.

27 Claims, 8 Drawing Sheets

(51) Int. Cl.
*H04N 19/184* (2014.01)
*H04N 19/186* (2014.01)
*H04N 19/70* (2014.01)
*H04N 19/80* (2014.01)

(52) U.S. Cl.
CPC .......... *H04N 19/186* (2014.11); *H04N 19/70* (2014.11); *H04N 19/80* (2014.11)

(56) References Cited

U.S. PATENT DOCUMENTS

| | | |
|---|---|---|
| 2017/0230656 A1 | 8/2017 | Leontaris et al. |
| 2018/0146197 A1* | 5/2018 | Yi ........................ H04N 19/124 |
| 2018/0167615 A1* | 6/2018 | Kim ....................... H04N 19/98 |
| 2021/0368203 A1* | 11/2021 | Zhang .................. H04N 19/159 |
| 2025/0119538 A1* | 4/2025 | Gao ....................... H04N 19/59 |

OTHER PUBLICATIONS

Peter de Rivaz et al., "AV1 Bitstream & Decoding Process Specification", Version 1.0.0 with Errata 1, Alliance for Open Media, Jan. 2019, 681 pgs.

\* cited by examiner

CCSO WITH BAND OFFSET ONLY OPTION

RELATED APPLICATIONS

This application claims priority to U.S. Provisional Patent Application No. 63/544,410, entitled "CCSO with Band Offset Only Option," filed Oct. 16, 2023, which is hereby incorporated by reference in its entirety.

TECHNICAL FIELD

The disclosed embodiments relate generally to video coding, including but not limited to systems and methods for loop filtering (e.g., cross-component offset filtering) of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes methods, systems, and non-transitory computer-readable storage media for applying a loop filter for video (image) compression. A video codec includes a plurality of function modules for one or more of: intra/inter prediction, transform coding, quantization, entropy coding, and in-loop filtering. In-loop filtering technologies are applied to adjust reconstructed picture samples to further reduce a reconstruction error. A cross-component offset filtering method is implemented to apply a co-located reconstructed sample and associated neighboring reconstructed samples of a first color component to derive an offset value that is added on a current sample of a second color component, thereby adjusting a reconstruction value of the current sample. Examples of the first color component is a luma color component, and examples of the second color component is a chroma color component. In some implementations, the first color component and the second color component correspond to the same color component, e.g., luma sample.

In various embodiments of this application, samples of a first color component are processed by a cross-component offset filter in loop filtering to determine an offset value that is added on a sample of a second color component. Cross-component offset filtering is implemented based on an edge preserving loop filter that using reconstructed color samples to determine the sample offsets of luma and/or chroma components. For example, a sample offset is determined based on luma values of a first luma sample and one or more neighboring luma samples, e.g., independently of any edge offset corresponding to a gradient between the first luma sample and associated neighboring luma sample(s).

In accordance with some embodiments, a method of video decoding is provided. The method includes receiving a video bitstream including a current image frame, wherein the video bitstream comprises a first syntax element indicating whether a first sample offset of a first color sample is determined based on values of one or more luma samples, e.g., independently of any associated luma gradient of the one or more luma samples. The method further includes determining that the first syntax element has a first predefined value that indicates that the band offset only mode is enabled; based on the band offset only mode, generating one or more quantized values based on the one or more luma samples including a first luma sample collocated with the first color sample in the current image frame; classifying the first color sample of the current image frame based on the one or more quantized values to determine the first sample offset of the first color sample; and reconstructing the current image frame at least by adjusting the first color sample based on the first sample offset of the first color sample.

In accordance with some embodiments, a method of video encoding is provided. The method includes receiving video data comprising a current image frame and a first syntax element; encoding the current image frame; based on the first syntax element, determining that the band offset only mode is enabled to determine a first sample offset of a first color sample based on values of one or more luma samples, e.g., independently of any associated luma gradient of the one or more luma samples; transmitting the encoded current image frame via a video bitstream; and signaling, via the video bitstream, the first syntax element to indicate that the band offset only mode is applied to reconstruct the first color sample collocated with the first luma sample based on the first sample offset.

In accordance with some embodiments, a method of bitstream conversion is provided. The method includes obtaining a source video sequence including a current image frame and performing a conversion between the source video sequence and a video bitstream. The video bitstream comprises the current image frame and a first syntax element indicating whether a first sample offset of a first color sample is determined based on values of one or more luma samples, e.g., independently of any associated luma gradient of the one or more luma samples. Based on the band offset only mode, the first sample offset of the first color sample is determined based on the one or more luma samples including a first luma sample collocated with the first color sample in the current image frame.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes methods, systems, and non-transitory computer-readable storage media for applying a loop filter for video (image) compression. In-loop filtering technologies are applied to adjust reconstructed picture samples to further reduce a reconstruction error. A cross-component offset filtering method is implemented to apply a collocated reconstructed sample and associated neighboring reconstructed samples of a first color component to derive an offset value that is added on a current sample of a second color component, thereby adjusting a reconstruction value of the current sample. In various embodiments of this application, a decoder receives a video bitstream from an encoder including a current image frame and a first syntax element indicating whether a first sample offset of a first color sample is determined based on values of one or more luma samples, e.g., independently of any associated luma gradient of the one or more luma samples. Sample values (e.g., not associated gradient values) of a first color component are used in cross-component offset filtering to determine an offset value that is added on a sample of a second color component. For example, luma samples are applied to generate an offset value of a first luma sample or a first chroma sample that is collocated with the first luma sample without involving gradient values of the luma samples.

More specifically, in some embodiments, a video decoder identifies a set of luma samples including a first luma sample and one or more neighboring luma samples of the first luma sample, e.g., based on a filter shape. The decoder does not determine difference values between the neighboring luma sample(s) and the first luma sample. The luma samples are quantized, e.g., using a scalar quantizer, to generate one or more quantized values without involving any difference values associated with the luma samples. The scalar quantizer may be specified by quantization intervals (e.g., ranges of values assigned to the same integer) and quantization levels (e.g., integer values to which a quantization interval is assigned). A first color sample is classified, e.g., by a classifier, based on the one or more quantized values to determine a first sample offset of the first color sample. The first color sample is adjusted based on the first sample offset of the first color sample, thereby enabling reconstruction of the current image frame.

Figure 1:
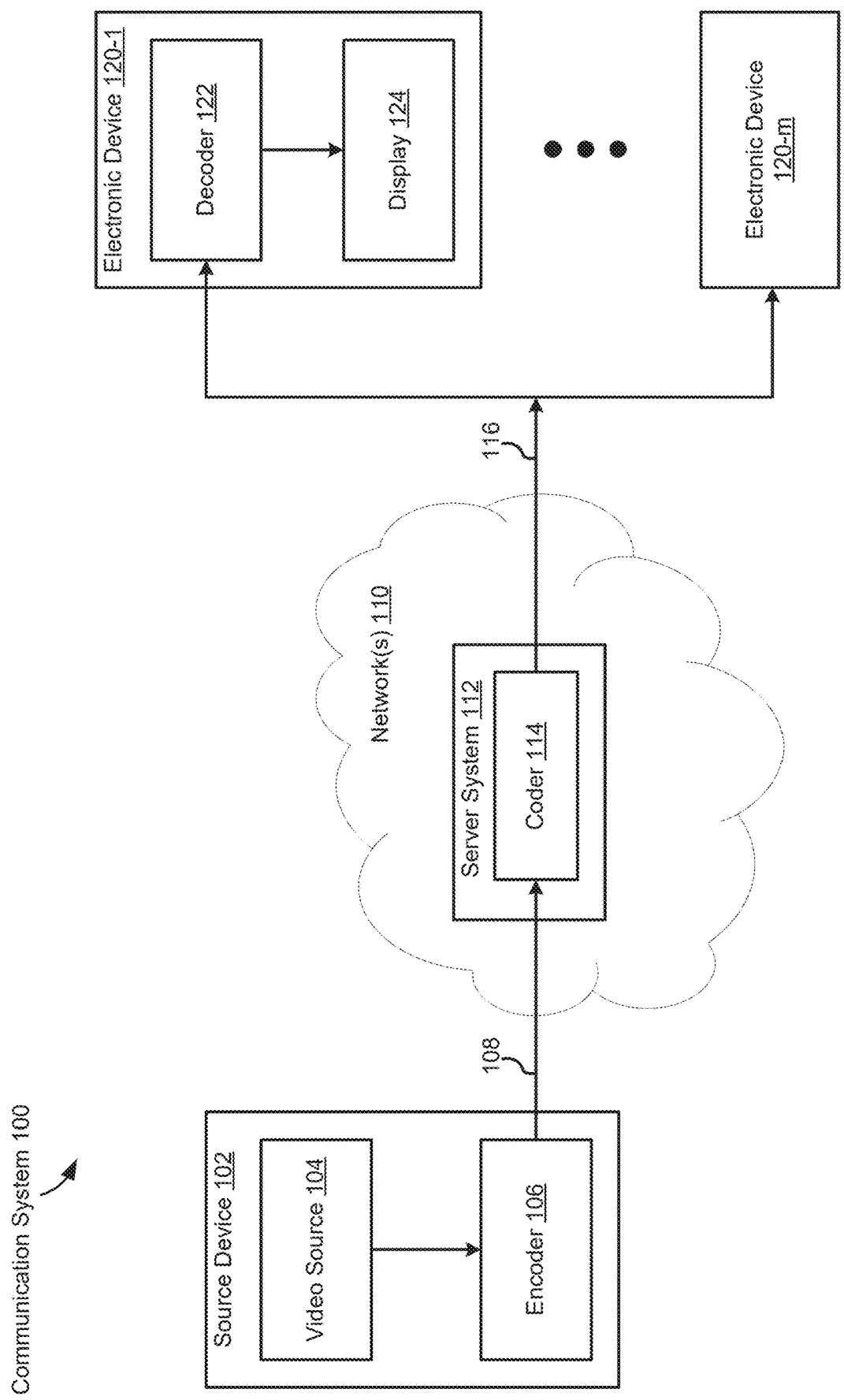
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
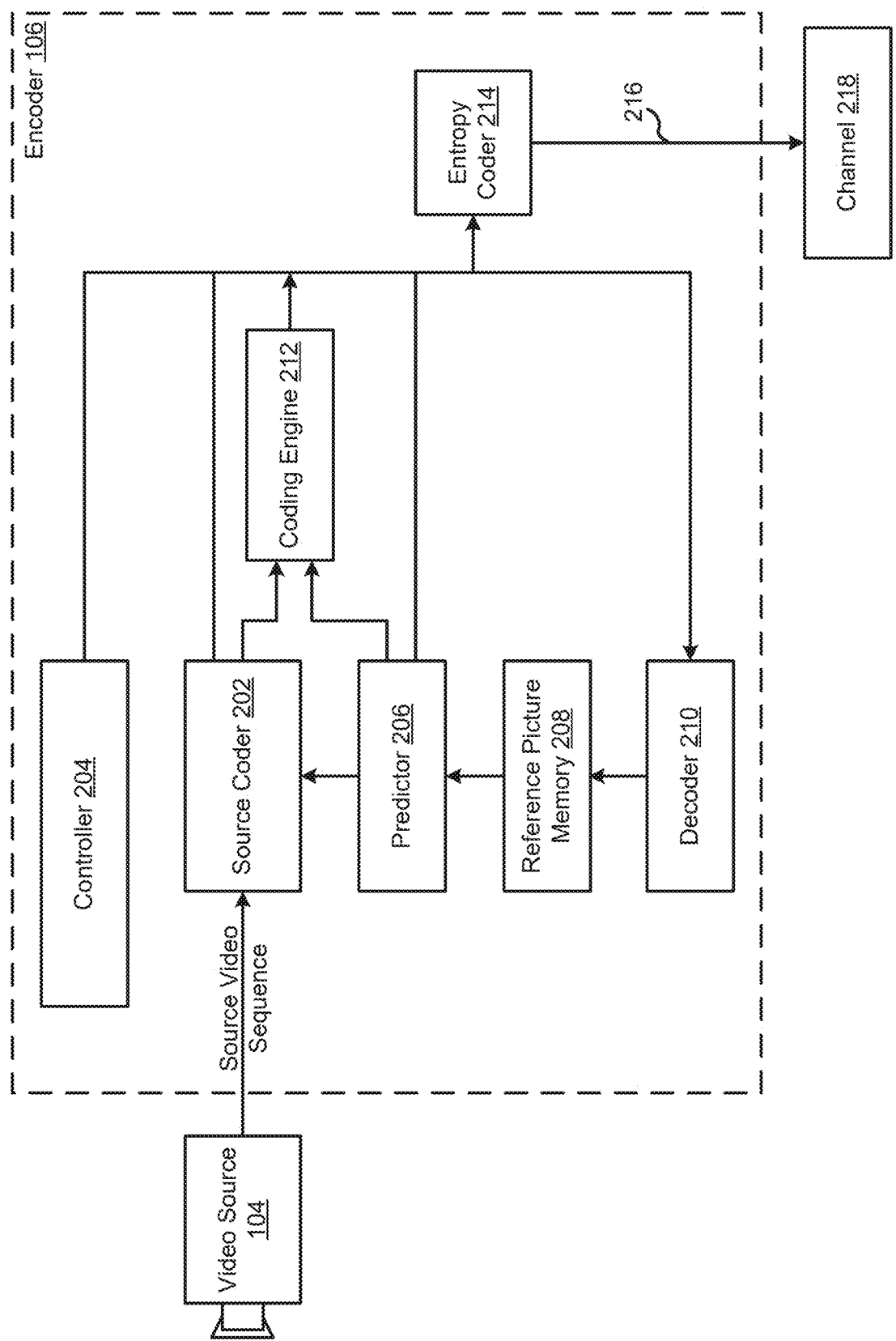
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
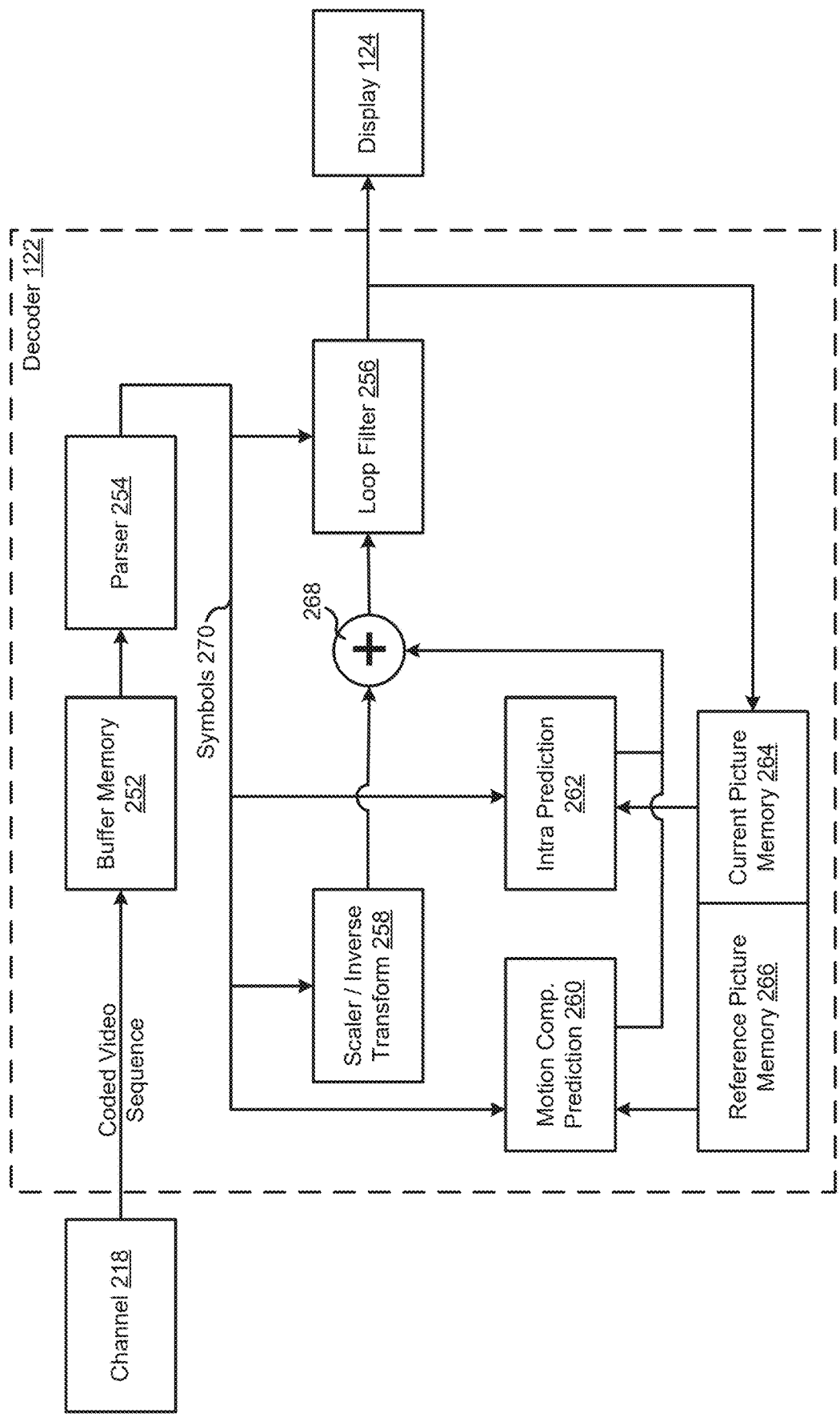
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
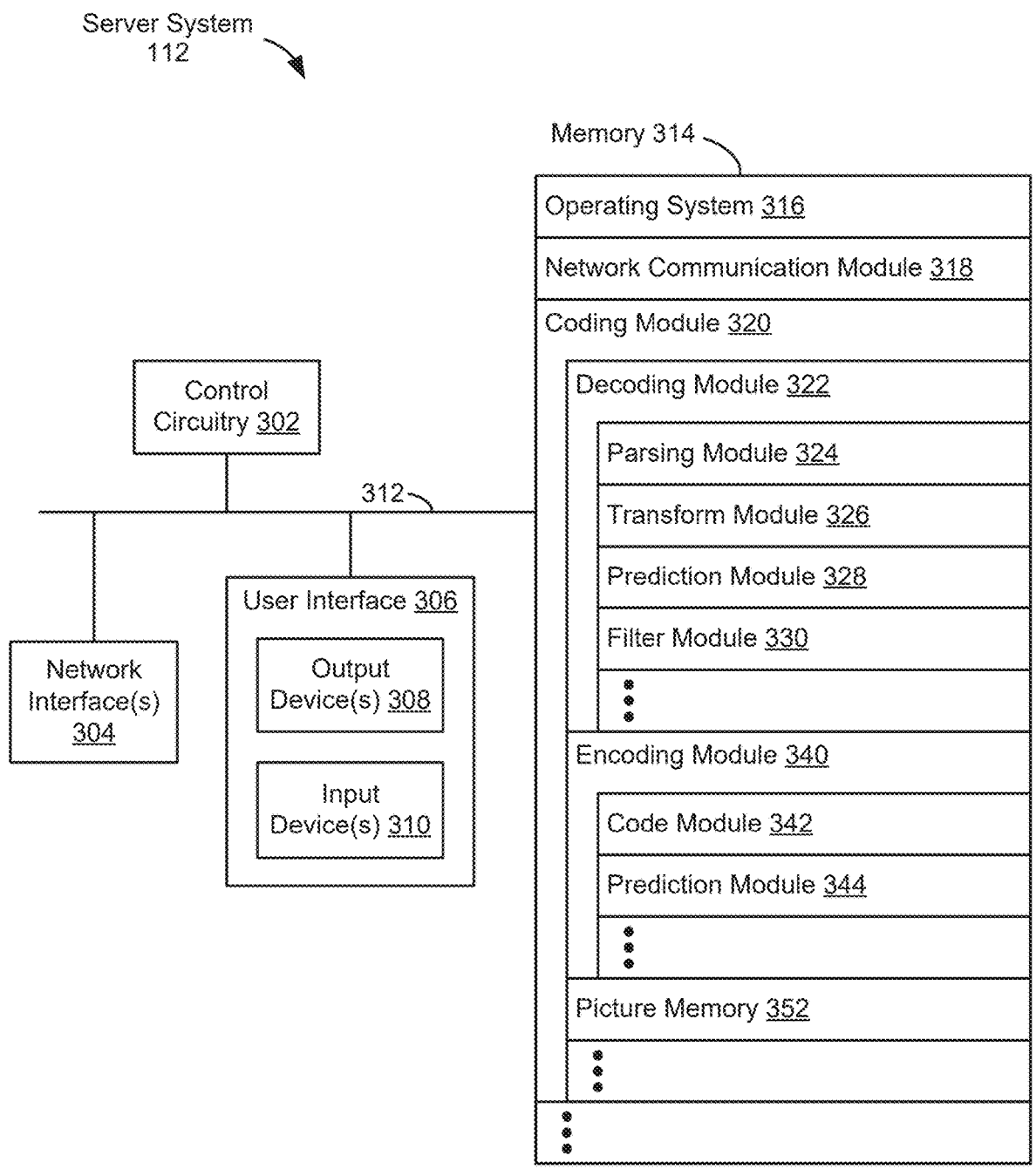
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
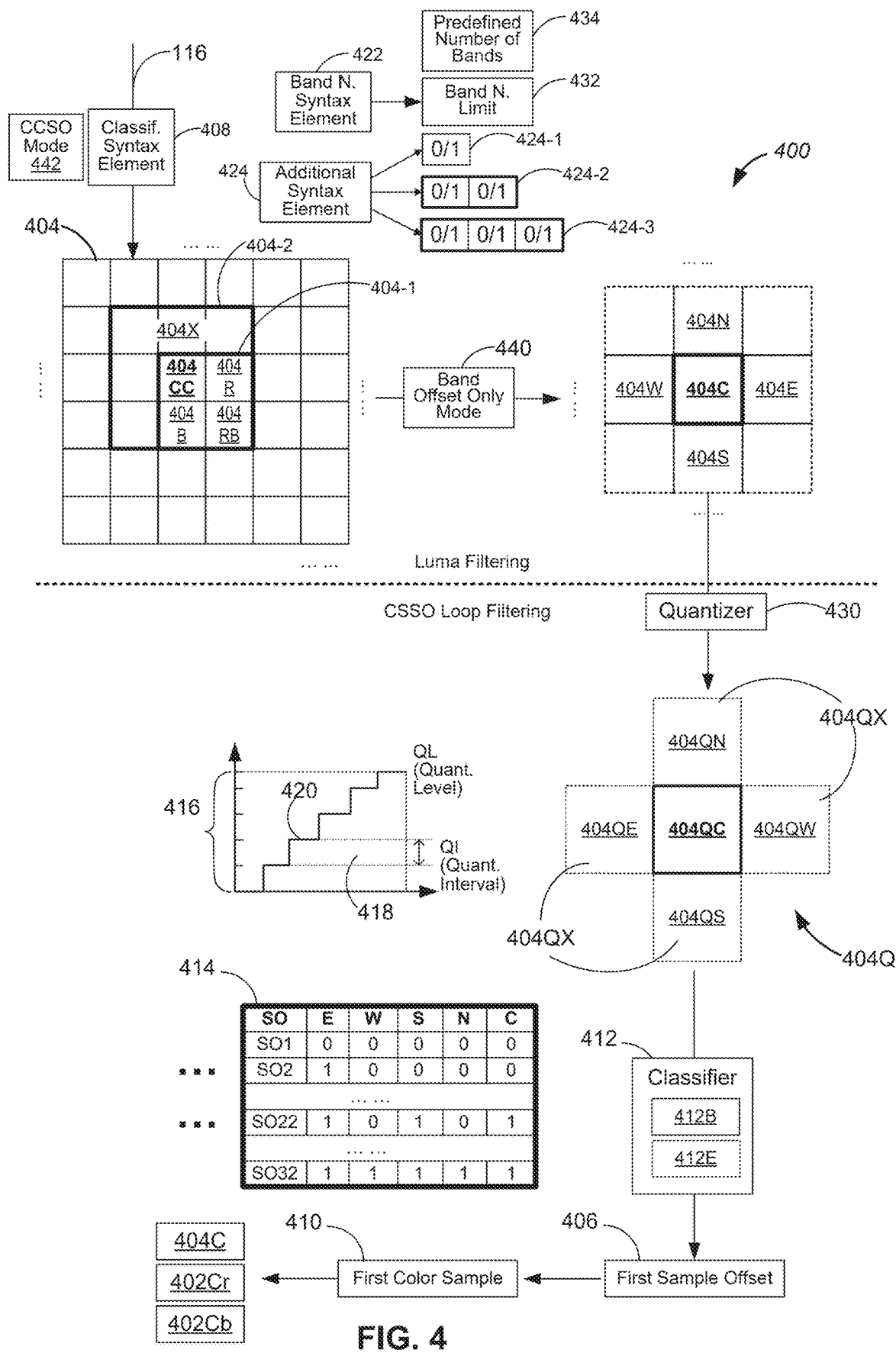
FIG. 4 is a flow diagram of an example process of applying a band offset only mode in in-loop filtering, in accordance with some embodiments.

FIG. 4 is a flow diagram of an example process 400 of applying a band offset only mode 440 in in-loop filtering, in accordance with some embodiments. A GOP includes a sequence of image frames that further includes a current image frame. The current image frame includes a color image, i.e., a non-monochrome image frame, which has a plurality of color samples (e.g., chroma samples 402 and luma samples 404) co-located with one another. After the plurality of color samples of the current image frame are reconstructed, in-loop filtering is applied to adjust a subset of color samples, thereby improving an image quality of the current image frame. In some embodiments, a reconstructed sample and its neighboring reconstructed samples of a first color component are combined to derive an offset value for a second color component, and a reconstructed sample of the second color component is co-located with the reconstructed sample of the first color component and adjusted by the offset value. Further, in some embodiments, reconstructed samples of the first color component are used in a band offset only mode 440 to derive an offset value for a second color component (e.g., luma samples 404, chroma samples 402). A sample of the second color component is adjusted by the offset value. The first color component is optionally identical to or distinct from the second color component.

A first syntax element 408 is used to define a band offset only mode 440, indicating whether a first sample offset 406 of a first color sample 410 is determined based on luma samples 404, independently of any associated luma gradient of the luma samples 404. In the band offset only mode 440, values of the luma samples 404 (e.g., a first luma sample 404C and one or more neighboring luma samples 404X) may be quantized and classified to derive a sample offset 406, which is applied to adjust the first luma sample 404C itself. Alternatively, the first luma sample 404C and neighboring luma samples 404X may be used to derive a sample offset 406, and a first chroma sample 402C is co-located with the first luma sample 404AC and may be adjusted by the sample offset 406.

More specifically, a decoder 122 receives a video bitstream 116 including the current image frame and a first syntax element 408 for a band offset only mode 440. The first syntax element 408 indicates whether a first sample offset 406 of a first color sample 410 is determined based on values of one or more luma samples 404, independently of any associated luma gradient of the one or more luma samples 404. The first syntax element 408 has a first predefined value (e.g., "1") that indicates that the band offset only mode 440 is enabled. Based on the band offset only mode 440 is enabled, the decoder 122 generates one or more quantized values 404Q based on the one or more luma samples 404 including a first luma sample 404C collocated with the first color sample 410 in the current image frame. The first color sample 410 is classified based on the one or more quantized values 404Q to determine the first sample offset 406 of the first color sample 410. The decoder 122 reconstructs the current image frame at least by adjusting the first color sample 410 based on the first sample offset 406.

In some embodiments, the first color sample 410 is one of: the first luma sample 404C, a first blue-difference chroma (Cb) sample 402Cr, and a first blue-difference chroma (Cb) sample 402Cb. The first luma sample 404C, the first Cb sample 402Cb, and the first Cr sample 402Cr are collocated with one another. In some embodiments, the video bitstream 116 includes a first syntax element for a cross-component sample offset (CCSO) mode 442. The CCSO mode 442 indicates whether the first sample offset 406 of the first color sample 410 is determined based on one or more luma samples 404. The first syntax element has a first predefined value indicating that the CCSO mode 442 is enabled.

The video stream 116 includes an alternative image frame and an associated first syntax element 408 for the band offset only mode 440. The decoder 122 determines that the associated first syntax element 408 has a second predefined value (e.g., "0") indicating that the band offset only mode 440 is disabled for the alternative image frame. A second sample offset of a second color sample that is collocated with a second luma sample in the alternative image frame based on band offset classification and edge offset classification. For the alternative image frame, a set of luma samples and associated difference values of the luma samples are quantized, and applied in band offset classification and edge offset classification, respectively. A band offset classification result and an edge offset classification result are used jointly to determine the second sample offset.

In some embodiments, the first syntax element 408 is signaled on a frame level separately for a first color component corresponding to the first color sample 410 (e.g., luma samples 404, chroma samples 402). Alternatively, in some embodiments, the first syntax element 408 is a flag signaled on a frame level for a plurality of color components of the current image frame, and the plurality of color components include a first color component corresponding to the first color sample 410. The flag is signaled to control band offset classification jointly for the luma samples 404 and chroma samples 402. The first color sample 410 is one of the first luma sample 404C, the first Cr sample 402Cr, and the first Cb sample 402Cb.

Alternatively, in some embodiments, the current image frame includes a plurality of color components, which further includes a first color component corresponding to the first color sample 410, and the first syntax element 408 is signaled on a frame level and includes a plurality of classification syntax flags each of which indicates whether to enable the band offset only mode for a respective color component. A first classification syntax flag may be signaled for the luma samples 404. A second first syntax element may be signaled for the Cb samples 402Cb, and a third classification syntax flag may be signaled for the Cr samples 402Cr. In an example, each sample of the current image frame includes a luma component 404, a blue-difference chroma (Cb) component 402Cb, and a red-difference chroma (Cr) component 402Cr. The first color sample 410 corresponds to one of the luma component 404, the Cr component 402Cr, and the Cb component 402Cb. The first syntax element 408 is signaled on a frame level and includes a first classification syntax flag and a second classification syntax flag. The first classification syntax flag indicates whether to enable the band offset only mode 440 for the luma component 404, and the second classification syntax flag indicates whether to enable the band offset only mode 440 for the Cb component 402Cb and the Cr component 402Cr jointly.

In some embodiments, in accordance with a determination that the first syntax element 408 has the first predefined value (e.g., "1") indicating that the band offset only mode 440 is enabled, the decoder 122 identifies, in the video bitstream 116, a band number syntax element 422 indicating a band number limit 432 associated with the band offset only mode 440. Further, in some embodiments, the band number limit 432 is signaled in a binary logarithm, which is a positive integer, thereby reducing a signaling overhead. For example, the band number limit 432 is 64 bands, and is represented as 5 in the binary logarithm. In another example, the band number limit 432 is 128 bands, and is represented as 7 in the binary logarithm. In another example, the band number limit 432 is 256 bands, and is represented as 8 in the binary logarithm. In some embodiments, the current image frame has a bit depth, and the band number limit 432 is determined by a bitwise left shift operation associated with the bit depth. For example, the band number limit 432 is equal to 1<<bit depth.

In some embodiments, in accordance with a determination that the first syntax element 408 has a second predefined value (e.g., "0") indicating that the band offset only mode is disabled for a distinct image frame, the decoder 122 identifies, in the video bitstream 116, a band number syntax element 422 indicating a band number limit 432 associated with both band offset classification and edge offset classification of the distinct image frame.

In some embodiments, in accordance with a determination that the first syntax element 408 has the first predefined value (e.g., "1") indicating that the band offset only mode 440 is enabled for the current image frame, the decoder 122 identifies a predefined fixed number 434 of bands associated with the band offset only mode 440. For example, the predefined fixed number 434 of bands is one of: 128, 256, and 64.

In some embodiments, in accordance with a determination that the first syntax element 408 has the first predefined value (e.g., "1") indicating that the band offset only mode 440 is enabled for the current image frame, the decoder 122 identifies, in the video bitstream 116, an additional syntax element 424 indicating a location of the first luma sample, which is applied for band offset classification of the first color sample 410. Further, in some embodiments, the additional syntax element 424 has a single bit 424-1 selecting, as the first luma sample 404C, one of a third set of two luma samples including at least a collocated luma sample 404CC sharing a top left corner with the first color sample 410. Alternatively, in some embodiments, the additional syntax element 424 has two bits 424-2 selecting, as the first luma sample 404C, one of a first subset of four luma samples 404-1 including a current or collocated luma sample 404CC sharing a top left corner with the first color sample 410, a right neighboring luma sample 404R, a bottom neighboring luma sample 404B, and a bottom right neighboring luma sample 404BR. Alternatively, in some embodiments, the additional syntax element 424 has three bits 424-3 selecting, as the first luma sample 404C, one of a second subset of nine luma samples 404-2 including a current or collocated luma sample 404CC sharing a top left corner with the first color sample 410 and eight surrounding neighboring luma samples 404X of the collocated luma sample 404CC.

In some embodiments associated with band offset classification, the CCSO mode 442 corresponds to a band offset classifier 412B. Based on the band offset classifier 412B, the decoder 122 determines that a set of luma samples 404 includes a first luma sample 404C and one or more neighboring luma samples 404X. The set of luma samples 404 are provided to a quantizer 430, and used to generate one or more quantized values 404Q, which are further applied by the band offset classifier 412B to classify the first color sample 410. For example, a filter type has a cross shape and includes four taps. The set of neighboring luma samples include the first luma sample 404C, a north luma sample 404N, a south luma sample 404S, a west luma sample 404W, and an east luma sample 404E, and these luma samples 404 are further quantized to quantized values 404QC, 404QN, 404QS, 404QW, and 404QE, respectively.

The first color sample 410 is classified, e.g., by a classifier 412, based on the quantized values 404Q to determine the first sample offset 406 of the first color sample 410. In an example, the quantized values 404Q include the quantized values 404QC, 404QN, 404QS, 404QW, and 404QE. A lookup table 414 maps a plurality of combinations of the quantized values 404QC, 404QN, 404QS, 404QW, and 404QE to different sample offset options SO (e.g., SO1-SQ16). Based on the lookup table 414, the quantized values 404Q correspond to one of the combinations in the lookup table 414, and a corresponding sample offset option SO is identified to correspond to a combination of the quantized difference values 404Q and therefore selected for the first sample offset 406. In other words, in some embodiments, the decoder 122 classifies the first color sample 410 by identifying a combination of the one or more quantized values 404Q in a lookup table 414 associating a plurality of quantized combinations with a plurality of offset value options SO (e.g., SO1-SO16) and determining the first sample offset 406 corresponding to the combination of the one or more quantized values 404Q in the lookup table 414.

In some embodiments, values of luma sample(s) 404A (not associated difference values or gradients) are quantized to a plurality of integer values in a quantization range 416 using a scalar quantizer 430 including a plurality of quantization intervals 418 (QI) and a plurality of quantization levels 420 (QL), and each of the one or more quantized values 404Q includes a respective integer in the quantization range 416. For each integer value in the quantization range 416, a quantization interval 418 is defined to be a range of values assigned to the respective integer value. A quantization level 420 corresponds to the respective integer value to which the range of difference values associated with the quantization interval 418 are assigned.

In some embodiments, in the band offset only mode 440, only the first luma sample 404 is quantized, e.g., by the quantizer 430, and classified to determine the first sample offset 406 of the first color sample 410. The first luma sample 404 is determined to be associated with one of a plurality of bands (e.g., bands 608). Each of the plurality of bands corresponds to a respective sample offset value. The first sample offset 406 is determined to be equal to the respective sample offset value corresponding to the one of the plurality of bands.

The first color sample 410 is adjusted based on the first sample offset 406 of the first color sample 410, thereby enabling reconstruction of the current image frame. In some embodiments, the first color sample 410 includes a first chroma sample 402C that is co-located with the first luma sample 404C in the current image frame, and the first chroma sample 402C is adjusted based on the first sample offset 406. Alternatively, in some embodiments, the first color sample 410 is the first luma sample 404C, and the first luma sample 404C is adjusted based on the first sample offset 406.

Figure 5:
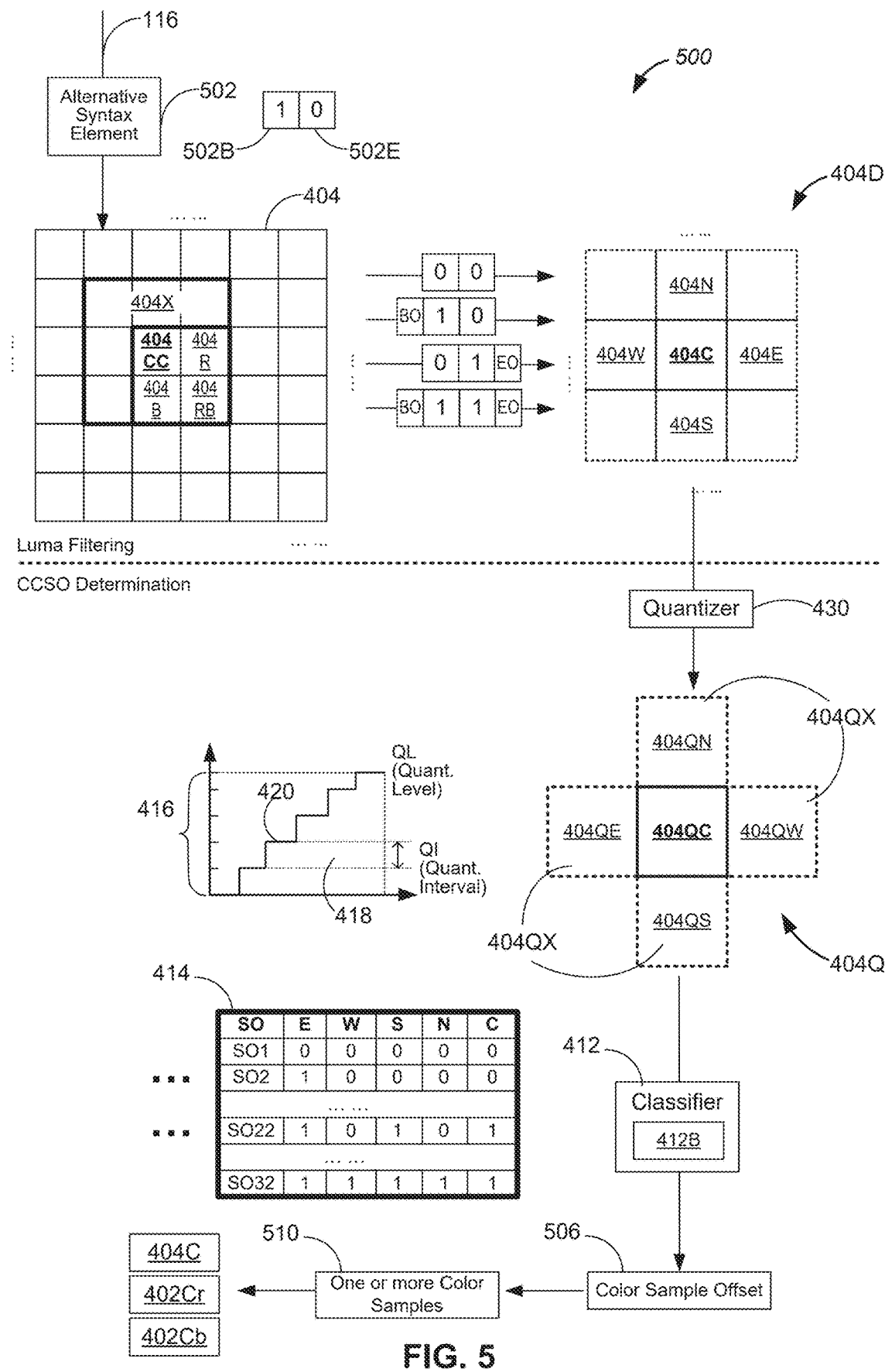
FIG. 5 is a flow diagram of an example process of applying cross-component sample offset in in-loop filtering, in accordance with some embodiments.

FIG. 5 is a flow diagram of an example process 500 of applying cross-component sample offset in in-loop filtering, in accordance with some embodiments. A decoder 122 receives a video bitstream 116 including the current image frame and a first syntax element 408 for. The first syntax element 408 indicates whether a first sample offset 406 of a first color sample 410 is determined based on values of one or more luma samples 404, independently of any associated luma gradient of the one or more luma samples 404. The first syntax element 408 has a first predefined value that indicates that the band offset only mode 440 is enabled. Based on the band offset only mode 440, the decoder 122 generates one or more quantized values 404Q based on the one or more luma samples 404 including a first luma sample 404C collocated with the first color sample 410 in the current image frame. The first color sample 410 is classified based on the one or more quantized values 404Q to determine the first sample offset 406 of the first color sample 410. The decoder 122 reconstructs the current image frame at least by adjusting the first color sample 410 based on the first sample offset 406.

In some embodiments, the video bitstream 116 further includes an alternative syntax element 502 indicating whether band offset and edge offset are applied to determine a color sample offset 506 for one or more color components 510, e.g., including the first color sample 410. Further, in some embodiments, the alternative syntax element 502 includes a first bit 502B indicating whether the band offset is applied and a second bit 502E indicating whether the edge offset are applied. In some embodiments, the one or more color components 510 include two or more of a luma component 404, a Cr component 402Cr, and a Cb component 404Cb, and the alternative syntax element 502 is signaled jointly for the one or more color components 510. In some embodiments, the one or more color components 510 include only one of a luma component 404, a Cr component 402Cr, and a Cb component 402Cb, and the alternative syntax element 502 is signaled individually for the only one of the one or more color components 510. Each remaining color component 510 may have a respective alternative syntax element. For example, three alternative syntax elements 502 each of which has two bits are used for the components 404, 402Cr, and 402Cb, respectively.

In some situations (e.g., associated with a disabled CCSO mode), in accordance with a determination that the first bit 502B has a first value (e.g., "0") to disable the band offset and that the second bit 502E has the first value (e.g., "0") to disable the edge offset, the video decoder 122 may abort cross-component offset filtering for the one or more color components 510. Alternatively, in some situations (e.g., associated with a band offset only mode 440), in accordance with a determination that the first bit 502B has a second value (e.g., "1") to enable the band offset and that the second bit 502E has the first value (e.g., "0") to disable the edge offset, the video encoder 122 may determine the color sample offset 506 based on the band offset for the one or more color components 510 in cross-component offset filtering. Alternatively, in some situations (e.g., associated with an edge offset only mode), in accordance with a determination that the first bit 502B has the first value (e.g., "0") to disable the band offset and that the second bit 502E has the second value (e.g., "1") to enable the edge offset, the video encoder may determine the color sample offset 506 based on the edge offset for the one or more color components 510 in cross-component offset filtering. Alternatively, in some situations (e.g., associated with a hybrid offset mode), in accordance with a determination that the first bit 502B has the second value (e.g., "1") to enable the band offset and that the second bit 502E has the second value (e.g., "1") to enable the edge offset, the video encoder 122 may determine the color sample offset 506 based on a combination of the band offset and the edge offset for the one or more color components 510 in cross-component offset filtering.

In some embodiments, as the second bit 502E has the second value to enable the edge offset, an edge offset classifier 412E is used in loop filtering. Based on the edge offset classifier 412E, the decoder 122 determines that the one or more luma samples 404 include the first luma sample 404C and one or more neighboring luma samples 404X, and further determines one or more difference values between the one or more neighboring luma samples 404X and the first luma sample 404C. The one or more quantized values 404Q are generated based on the one or more difference values and applied by the edge offset classifier 412E to classify the first color sample 410. For example, a filter type has a cross shape and includes four taps. The one or more neighboring luma samples include a north luma sample 404N, a south luma sample 404S, a west luma sample 404W, and an east luma sample 404E. The decoder 122 determines one or more difference values between the one or more neighboring luma samples and the first luma sample. For example, the one or more difference values includes one or more of: a north difference value, a south difference value, a west difference value, and an east difference value. Each of the difference values is a difference between a respective one of the neighboring luma samples 404X and the first luma sample 404C. The one or more difference values are quantized to generate one or more quantized values 404QX. For example, the one or more quantized values 404QX includes one or more of: a north quantized value 404QN, a south quantized value 404QS, a west quantized value 404QW, and an east quantized value 404QE. Each of the difference values is provided to a quantizer 430, and quantized to generate a respective one of the quantized values 404QN, 404QS, 404QW, and 404QE. The quantized value 404QC is equal to 0.

Further, in some embodiments, a lookup table 414 maps a plurality of combinations of the quantized values 404QN, 404QS, 404QW, and 404QE to different sample offset options SO (e.g., SO1-SQ16). Based on the lookup table 414, the quantized values 404Q correspond to one of the combinations in the lookup table 414, and a corresponding sample offset option SO is identified to correspond to a combination of the quantized difference values 404Q and therefore selected for the first sample offset 406.

Figure 6:
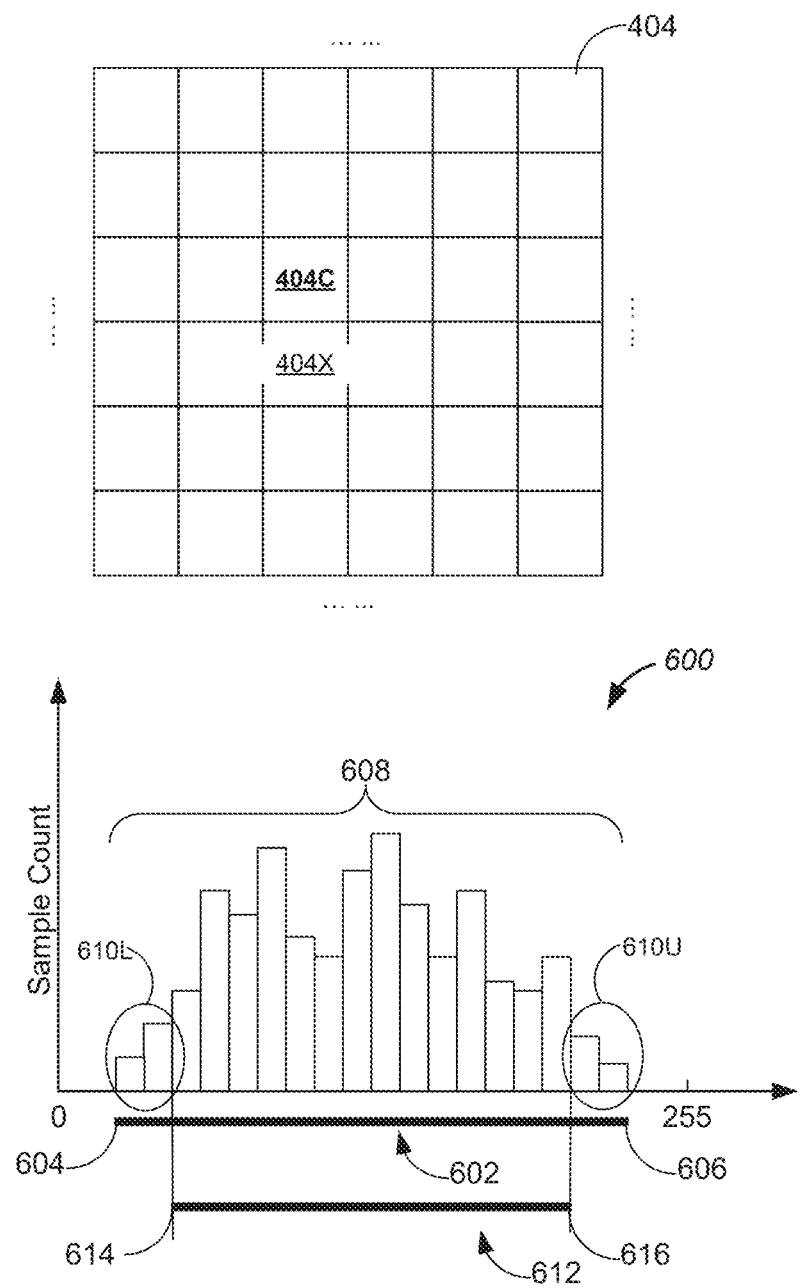
FIG. 6 is a histograms associated with a plurality of luma samples of a current image frame, in accordance with some embodiments.

FIG. 6 is a histograms 600 associated with a plurality of luma samples 404 of a current image frame, in accordance with some embodiments. A decoder 122 receives a video bitstream 116 including the current image frame and a first syntax element 408 for a band offset only mode 440. The first syntax element 408 indicates whether a first sample offset 406 of a first color sample 410 is determined based on values of one or more luma samples 404, independently of any associated luma gradient of the one or more luma samples 404. In some embodiments, a histogram 600 is identified for a plurality of luma samples 404 of the current image frame. Based on the histogram 620, a decoder 122 identifies a luma sample band range 602 for the current image frame, and the luma sample band range 602 is defined by a lower luma value threshold 604 and an upper luma value threshold 606. The luma sample band range 602 is divided into one or more bands 608 of luma values. Sample counts are plotted on the histogram 600 for the one or more bands 608. In some embodiments, the bands 608 may be uniform, having an equal width of luma values. Alternatively, in some embodiments not shown, the bands 608 may not be uniform, having respective widths of luma values.

In some embodiments, no luma sample of the current image frame has a luma value that is lower than the lower luma value threshold 604 or higher than the upper luma value threshold 606. In an example, the lower luma value threshold 604 is equal to a minimum luma value of the plurality of luma samples 404, and the upper luma value threshold 606 is equal to a maximum luma value of the plurality of luma samples 404.

Alternatively, in some embodiments, based on a luma sample band range 612, a first subset of luma samples 610L of the current image frame has luma values lower than a lower luma value threshold 614, and a second subset of luma samples 610U has luma values higher than an upper luma value threshold 616. A total number of luma samples that are lower than the lower luma value threshold 614 is less than a first count threshold, and a total number of luma samples that are greater than the higher luma value threshold is less than a second count threshold (e.g., which is equal to distinct from the first count threshold).

Figure 7:
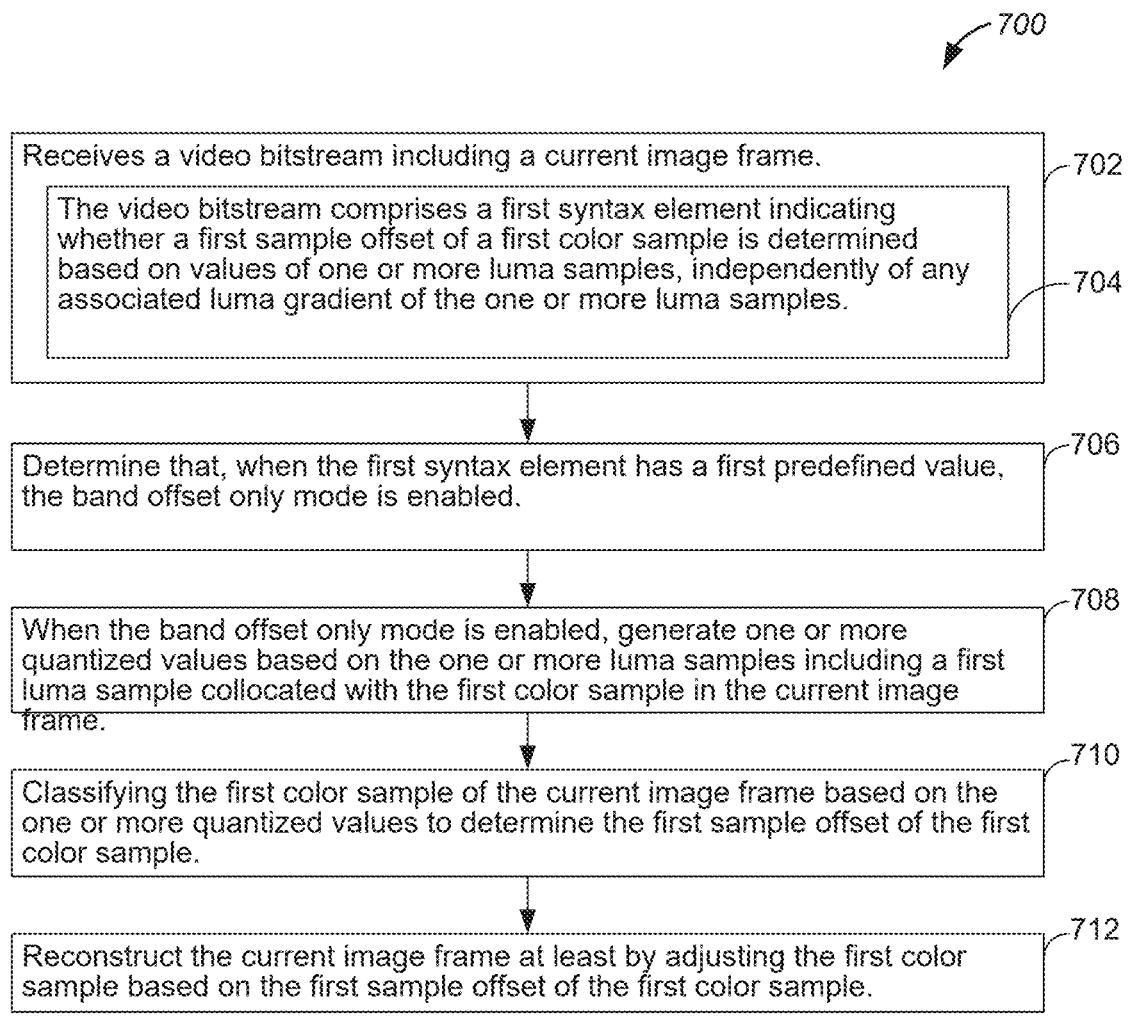
FIG. 7 is a flow diagram illustrating a method of coding video, in accordance with some embodiments.

FIG. 7 is a flow diagram illustrating an example method 700 of coding video, in accordance with some embodiments. The method 700 may be performed at a computing system (e.g., the server system 112, the source device 102, or the electronic device 120 in FIG. 1) having control circuitry and memory storing instructions for execution by the control circuitry. In some embodiments, the method 700 is applied jointly with one or more video codecs, including but not limited to, H.264, H.265/HEVC, H.266/VVC, AV1 and AVS/AVS2/AVS3. A cross-component offset filtering method is implemented based on an edge preserving loop filter that uses reconstructed samples (e.g., luma samples 404) to determine sample offsets 406 of luma samples 404 or chroma samples 402. The luma samples 404 may be classified based on band offsets (e.g., depending on luma samples 404) or edge offset (e.g., depending on gradient or difference values between a first luma sample 404C and neighboring luma samples 404X). In various embodiments of this application, the band offsets are used as a standalone option, independent from the edge offset to simplify design and increase a gain from a certain type of content (e.g., screen content).

In some embodiments, a flag (e.g., a first syntax element 408) is signaled at frame level (or other high-level syntax) to indicate whether a band offset only mode 440 is used. If the band offset only mode 440 is used, only the sample values of the current luma sample or the collocated luma sample (e.g., the first luma sample 404C) is used for offset classification. Otherwise, if the band only mode 440 is not used, both band offset, and edge offset are considered in classification. For example, the band offset only flag may be signaled at a frame level for each individual color component (e.g., for luma samples 404, for Cr samples). In an example, the band offset only flag may be signaled at a frame level and shared for all color components (e.g., 402 and 404)

jointly. In an example, the band offset only flag may be signaled at a frame level for luma and chroma components, and includes a first flag for luma samples 404 only and a second flag is shared for both chroma components 402.

In some embodiments, a band offset only flag (e.g., a first syntax element 408) is first signaled. If this flag indicate that the band offset only mode 440 is used, an additional syntax element (e.g., a band number syntax element 422) that indicate the maximum number of bands (e.g., a band number limit 422) for the band offset only mode 440 is further signaled. In an example, the maximum number of bands for the band offset only mode 440 may be signaled in a log 2 form to reduce signaling overhead. In another example, the upper limit of the maximum number of bands (e.g., a band number limit 422) may be equal to (1<<bit depths).

In some embodiments, a band offset only flag (e.g., a first syntax element 408) is first signaled. If this flag indicates that the band offset only mode 440 is used, a predefined fixed number 434 of bands for band only mode 440 is used in band offset classification. In some embodiments, the band offset only mode 440 is true. A predefined number 434 of bands are used in the band offset only mode 440, while the maximum number of bands (e.g., a band number limit 422) is used for the band offset plus edge offset mode 440. Examples of the predefined number 434 of bands include, but are not limited to, 128, 256, and 64.

In some embodiments, a band offset only flag (e.g., a first syntax element 408) is first signaled. In some situations, this flag indicate that the band offset only mode 440 is used, and an additional syntax element 424 (FIG. 4) is signaled to indicate a subset of luma samples used for band offset classification. For example, the additional syntax element 424-2 includes 2 bits configured to identify a subset of four luma samples 404-1, from which a first luma sample 404C is selected to be collocated with the first color sample 410. The subset of four luma samples 404-1 (FIG. 4) includes a current or collocated luma sample 404CC sharing a top left corner with the first color sample 410, a right luma sample 404R, a bottom luma sample 404B, and a right-bottom luma sample 404RB. In another example, the additional syntax element 424 includes 3 bits configured to identify a subset of nine luma samples 404-2, from which the first luma sample 404C is selected to be collocated with the first color sample 410. The subset of nine luma samples 404-2 (FIG. 4) includes the current or collocated luma sample 404CC sharing a top left corner with the first color sample 410 and its eight surrounding neighboring luma samples 404X. In yet another example, the additional syntax element 424 includes a single bit 424-1 configured to identify a subset of two luma samples, from which the first luma sample 404C is selected to be collocated with the first color sample 410. The subset of two luma samples includes at least the current or collocated luma sample 404CC and another neighboring luma sample 404X.

In some embodiments, for one or multiple color components 510 (FIG. 5), a syntax element 502 is signaled to indicate the usage of band offset and edge offset. In an example, the syntax element 502 is signaled jointly for multiple color components, e.g., jointly for luma samples 404 and Cb and Cr samples 402; jointly for Cb and Cr samples 402. Alternatively, in some embodiments, the syntax element is signaled separately for different color components, e.g., separately for luma samples 404, Cb samples, and Cr samples.

In some embodiments, the syntax element 502 includes a two-bit index. A first bit 502B indicates whether band offset is enabled, and a second bit 502E indicates whether edge offset is enabled. The syntax element 502 corresponds to four types of situations. First, in some embodiments, when the first bit 502B indicates the usage of band offset is signaled with a value (e.g., "0") that band offset is not enabled, and when the second bit 502E indicates the usage of edge offset is signaled with a value (e.g., "0") that edge offset is not enabled, cross-component offset filtering is disabled. Second, in some embodiments, when the first bit 502B indicates the usage of band offset is signaled with a value (e.g., "1") that band offset is enabled, and when the second bit 502E indicates the usage of edge offset is signaled with a value (e.g., "0") that edge offset is not enabled, only band offsets are applied for cross-component offset filtering. Third, in some embodiments, when the first bit 502B indicates the usage of band offset is signaled with a value (e.g., "0") that band offset is not enabled, and when the second bit 502E indicates the usage of edge offset is signaled with a value (e.g., "1") that edge offset is enabled, only edge offsets are applied for cross-component offset filtering. Fourth, in some embodiments, when the first bit 502B indicates the usage of band offset is signaled with a value (e.g., "1") that band offset is enabled, and when the second bit 502E indicates the usage of edge offset is signaled with a value (e.g., "1") that edge offset is enabled, a combination of band and edge offsets is applied for cross-component offset filtering.

In some embodiments, if a band only mode 440 is enabled for cross-component sample offset, the bands can be narrowed down using a histogram 600 (FIG. 6) of the current image frame or image sequence with luma value intensity thresholds (e.g., lower luma value thresholds 604 and 614, upper luma value thresholds 606 and 616). For example, referring to FIG. 6, the lowest allowed luma value is equal to 0, and the highest allowed luma value is equal to 1<<bit depth. The allowed values of the luma samples 404 are between 0 and 1<<bit depth, e.g., 0-255. Starting from the lowest allowed luma value (e.g., 0), a first luma value having a non-zero count in the histogram 600 corresponds to a start of a lowest band, and is set as a lower luma value threshold 604. A last luma value having non-zero count in the histogram 600 corresponds to an end of a highest band and is set as an upper luma value threshold 606. A luma sample band range 602 is set between the lower luma value threshold 604 and the upper luma value threshold 606. The luma sample band range 602 is divided into a plurality of luma value bands 608. In an example, the bands 608 correspond to luma values of 100-200 and 220-255, and are configured to cover luma values of 100-255. In another example, a luma sample band range 602 (e.g., 100-255) is divided to 32 uniform bands.

In another example, a lower luma value threshold 614 is determined based on a sample count. A total sample count lower than the lower luma value threshold 614 is equal to a first count threshold (e.g., 10-15), and a total sample count higher than the upper luma value threshold 616 is equal to a second count threshold (e.g., 10-15). The luma value range 612 between the lower luma value threshold 614 and the upper luma value threshold 616 is divided into a plurality of bands 608.

Although FIG. 7 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 700 is implemented for decoding video data. The method 700 includes receiving (operation 702) a video bitstream including a current image frame, where the video bitstream comprises (operation 704) a first syntax element indicating whether a first sample offset of a first color sample is determined based on values of one or more luma samples, independently of any associated luma gradient of the one or more luma samples; determining (operation 706) that, when the first syntax element has a first predefined value, the band offset only mode is enabled; when the band offset only mode is enabled, generating (operation 708) one or more quantized values based on the one or more luma samples including a first luma sample collocated with the first color sample in the current image frame; classifying (operation 710) the first color sample of the current image frame based on the one or more quantized values to determine the first sample offset of the first color sample; and reconstructing (operation 712) the current image frame at least by adjusting the first color sample based on the first sample offset of the first color sample.

(A2) In some embodiments of A1, where the video stream includes an alternative image frame and an associated first syntax element for the band offset only mode. The method 700 further comprises: determining that the associated first syntax element is associated with the alternative image frame and that the flag of the first syntax element has a second predefined value indicating that the band offset only mode is disabled; and generating a second sample offset of a second color sample that is collocated with a second luma sample in the alternative image frame based on band offset classification and edge offset classification.

(A3) In some embodiments of A1 or A2, the first syntax element is signaled on a frame level separately for a first color component corresponding to the first color sample.

(A4) In some embodiments of any of A1-A3, the current image frame includes a plurality of color components, which further includes a first color component corresponding to the first color sample, and the first syntax element is signaled on a frame level and includes a plurality of classification syntax flags each of which indicates whether to enable the band offset only mode for a respective color component.

(A5) In some embodiments of any of A1-A4, the first syntax element is a flag signaled on a frame level for a plurality of color components of the current image frame, and the plurality of color components include a first color component corresponding to the first color sample.

(A6) In some embodiments of any of A1-A5, each sample of the current image frame includes a luma component, a blue-difference chroma (Cb) component, and a red-difference chroma (Cr) component, the first color sample corresponds to one of the luma component, the Cr component, and the Cb component. The first syntax element is signaled on a frame level and includes a first classification syntax flag and a second classification syntax flag. The first classification syntax flag indicates whether to enable the band offset only mode for the luma component, the second classification syntax flag indicating whether to enable the band offset only mode for the Cb component and the Cr component jointly.

(A7) In some embodiments of any of A1-A6, the method 700 further comprises in accordance with a determination that the first syntax element has the first predefined value indicating that the band offset only mode is enabled, identifying, in the video bitstream, a band number syntax element indicating a band number limit associated with the band offset only mode.

(A8) In some embodiments of A7, the band number limit is signaled in a binary logarithm, which is a positive integer.

(A9) In some embodiments of A7, the current image frame has a bit depth, and the band number limit is determined by a bitwise left shift operation associated with the bit depth.

(A10) In some embodiments of any of A1-A9, the method 700 further comprises, in accordance with a determination that the first syntax element has a second predefined value indicating that the band offset only mode is disabled for a distinct image frame, identifying, in the video bitstream, a band number syntax element indicating a band number limit associated with both band offset classification and edge offset classification of the distinct image frame.

(A11) In some embodiments of any of A1-A10, the method 700 further comprises, in accordance with a determination that the first syntax element has the first predefined value indicating that the band offset only mode is enabled for the current image frame, identifying a predefined fixed number of bands associated with the band offset only mode.

(A12) In some embodiments of A11, the predefined fixed number of bands is one of: 128, 256, and 64.

(A13) In some embodiments of any of A1-A12, the method 700 further comprises, in accordance with a determination that the flag of the first syntax element has the first predefined value indicating that the band offset only mode is enabled for the current image frame, identifying, in the video bitstream, an additional syntax element indicating a location of the first luma sample, which is applied for band offset classification of the first color sample.

(A14) In some embodiments of A13, the additional syntax element has two bits selecting, as the first luma sample, one of a first subset of four luma samples including a collocated luma sample sharing a top left corner with the first color sample, a right neighboring luma sample, a bottom neighboring luma sample, and a bottom right neighboring luma sample.

(A15) In some embodiments of A13, the additional syntax element has three bits selecting, as the first luma sample, one of a second subset of nine luma samples including a collocated luma sample sharing a top left corner with the first color sample and eight surrounding neighboring luma samples of the collocated luma sample.

(A16) In some embodiments of A13, the additional syntax element has a single bit selecting, as the first luma sample, one of two positions corresponding to at least a collocated luma sample sharing a top left corner with the first color sample.

(A17) In some embodiments of any of A1-A16, the video bitstream further includes an alternative syntax element indicating whether band offset and edge offset are applied to determine color sample offset for one or more color components.

(A18) In some embodiments of A17, the alternative syntax element includes a first bit indicating whether the band offset are applied and a second bit indicating whether the edge offset is applied.

(A19) In some embodiments of A18, the method 700 further comprises one of operations consisting of: (1) in accordance with a determination that the first bit has a first value to disable the band offset and that the second bit has the first value to disable the edge offset, aborting cross-component offset filtering for the one or more color components; (2) in accordance with a determination that the first bit has a second value to enable the band offset and that the second bit has the first value to disable the edge offset, determine the color sample offsets based on the band offset for the one or more color components in cross-component offset filtering; (3) in accordance with a determination that the first bit has the first value to disable the band offset and that the second bit has the second value to enable the edge offset, determine the color sample offsets based on the edge offset for the one or more color components in cross-component offset filtering; and (4) in accordance with a determination that the first bit has the second value to enable the band offset and that the second bit has the second value to enable the edge offset, determine the color sample offsets based on a combination of the band offset and the edge offset for the one or more color components in cross-component offset filtering.

(A20) In some embodiments of A17 or A18, the one or more color components includes two or more of a luma component, a Cr component, and a Cb component, and the alternative syntax element is signaled jointly for the one or more color components.

(A21) In some embodiments of A17 or A18, the one or more color components includes only one of a luma component, a Cr component, and a Cb component, and the alternative syntax element is signaled individually for the one or more color components.

(A22) In some embodiments of any of A1-A21, the method 700 further comprises identifying a histogram of luma samples of the current image frame; based on the histogram, identifying a luma sample band range for the current image frame, the luma sample band range being defined by a lower luma value threshold and an upper luma value threshold; and dividing the luma sample band range into one or more bands of luma values.

(A23) In some embodiments of A22, no luma sample of the current image frame has a luma value that is lower than the luma value threshold or higher than the upper luma value threshold.

(A24) In some embodiments of A23, a total number of luma samples that are lower than the lower luma value threshold is less than a count threshold, and a total number of luma samples that are greater than the higher luma value threshold is less than the count threshold.

(A25) In some embodiments of any of A1-A24, the video bitstream further includes a first syntax element for a cross-component sample offset (CCSO) mode indicating whether the first sample offset of the first color sample of the current image frame is determined based on one or more luma samples.

(A26) In some embodiments, a computing system comprises control circuitry; and memory storing one or more programs configured to be executed by the control circuitry. The one or more programs further comprises instructions for: receiving video data comprising a current image frame and a first syntax element; encoding the current image frame; based on the first syntax element, determining that the band offset only mode is enabled to determine a first sample offset of a first color sample based on values of one or more luma samples, independently of any associated luma gradient of the one or more luma samples; transmitting the encoded current image frame via a video bitstream; and signaling, via the video bitstream, the first syntax element to indicate that the band offset only mode is applied to reconstruct the first color sample collocated with the first luma sample based on the first sample offset.

(A27) In some embodiments, a non-transitory computer-readable storage medium stores one or more programs for execution by control circuitry of a computing system. The one or more programs comprises instructions for: obtaining a source video sequence including a current image frame; and performing a conversion between the source video sequence and a video bitstream. The video bitstream comprises: the current image frame; and a first syntax element indicating whether a first sample offset of a first color sample is determined based on values of one or more luma samples, independently of any associated luma gradient of the one or more luma samples. When the band offset only mode is enabled, the first sample offset of the first color sample is determined based on the one or more luma samples including a first luma sample collocated with the first color sample in the current image frame.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A26 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A26 above).

The proposed methods may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
   receiving a video bitstream including a current image frame, wherein the video bitstream comprises a first syntax element indicating whether a first sample offset of a first color sample is determined based on values of one or more luma samples, independently of any associated luma gradient of the one or more luma samples;
   determining that, when the first syntax element has a first predefined value, the band offset only mode is enabled;
   when the band offset only mode is enabled, generating one or more quantized values based on the one or more luma samples including a first luma sample collocated with the first color sample in the current image frame;
   classifying the first color sample of the current image frame based on the one or more quantized values to determine the first sample offset of the first color sample; and
   reconstructing the current image frame at least by adjusting the first color sample based on the first sample offset of the first color sample.

2. The method of claim 1, wherein the video stream includes an alternative image frame and an associated first syntax element, the method further comprising:
   determining that the associated first syntax element is associated with the alternative image frame and has a second predefined value indicating that the band offset only mode is disabled; and
   generating a second sample offset of a second color sample that is collocated with a second luma sample in the alternative image frame based on band offset classification and edge offset classification.

3. The method of claim 1, wherein the first syntax element is signaled on a frame level separately for a first color component corresponding to the first color sample.

4. The method of claim 1, wherein the current image frame includes a plurality of color components, which further includes a first color component corresponding to the first color sample, and the first syntax element is signaled on a frame level and includes a plurality of classification syntax flags each of which indicates whether to enable the band offset only mode for a respective color component.

5. The method of claim 1, wherein the first syntax element is a flag signaled on a frame level for a plurality of color components of the current image frame, and the plurality of color components include a first color component corresponding to the first color sample.

6. The method of claim 1, wherein:
   each sample of the current image frame includes a luma component, a blue-difference chroma (Cb) component, and a red-difference chroma (Cr) component, the first color sample corresponds to one of the luma component, the Cr component, and the Cb component; and
   the first syntax element is signaled on a frame level and includes a first syntax flag and a second syntax flag, the first syntax flag indicating whether to enable the band offset only mode for the luma component, the second syntax flag indicating whether to enable the band offset only mode for the Cb component and the Cr component jointly.

7. The method of claim 1, further comprising:
   in accordance with a determination that the first syntax element has the first predefined value indicating that the band offset only mode is enabled, identifying, in the video bitstream, a band number syntax element indicating a band number limit associated with the band offset only mode.

8. The method of claim 7, wherein the band number limit is signaled in a binary logarithm, which is a positive integer.

9. The method of claim 7, wherein the current image frame has a bit depth, and the band number limit is determined by a bitwise left shift operation associated with the bit depth.

10. The method of claim 1, further comprising:
    in accordance with a determination that the first syntax element has a second predefined value indicating that the band offset only mode is disabled for a distinct image frame, identifying, in the video bitstream, a band number syntax element indicating a band number limit associated with both band offset classification and edge offset classification of the distinct image frame.

11. The method of claim 1, further comprising:
    in accordance with a determination that the first syntax element has the first predefined value indicating that the band offset only mode is enabled for the current image frame, identifying a predefined fixed number of bands associated with the band offset only mode.

12. The method of claim 11, wherein the predefined fixed number of bands is one of: 128, 256, and 64.

13. The method of claim 1, further comprising:
    in accordance with a determination that the flag of the first syntax element has the first predefined value indicating that the band offset only mode is enabled for the current image frame, identifying, in the video bitstream, an additional syntax element indicating a location of the first luma sample, which is applied for band offset classification of the first color sample.

14. The method of claim 13, wherein the additional syntax element has two bits selecting, as the first luma sample, one of a first subset of four luma samples including a collocated luma sample sharing a top left corner with the first color sample, a right neighboring luma sample, a bottom neighboring luma sample, and a bottom right neighboring luma sample.

15. The method of claim 13, wherein the additional syntax element has three bits selecting, as the first luma sample, one of a second subset of nine luma samples including a collocated luma sample sharing a top left corner with the first color sample and eight surrounding neighboring luma samples of the collocated luma sample.

16. The method of claim 13, wherein the additional syntax element has a single bit selecting, as the first luma sample, one of two positions corresponding to at least a collocated luma sample sharing a top left corner with the first color sample.

17. The method of claim 1, wherein the video bitstream further includes an alternative syntax element indicating whether band offset and edge offset are applied to determine color sample offset for one or more color components.

18. The method of claim 17, wherein the alternative syntax element includes a first bit indicating whether the band offset are applied and a second bit indicating whether the edge offset is applied.

19. The method of claim 18, further comprising one of operations consisting of:
  in accordance with a determination that the first bit has a first value to disable the band offset and that the second bit has the first value to disable the edge offset, aborting cross-component offset filtering for the one or more color components;
  in accordance with a determination that the first bit has a second value to enable the band offset and that the second bit has the first value to disable the edge offset, determine the color sample offsets based on the band offset for the one or more color components in cross-component offset filtering;
  in accordance with a determination that the first bit has the first value to disable the band offset and that the second bit has the second value to enable the edge offset, determine the color sample offsets based on the edge offset for the one or more color components in cross-component offset filtering; and
  in accordance with a determination that the first bit has the second value to enable the band offset and that the second bit has the second value to enable the edge offset, determine the color sample offsets based on a combination of the band offset and the edge offset for the one or more color components in cross-component offset filtering.

20. The method of claim 17, wherein the one or more color components includes two or more of a luma component, a Cr component, and a Cb component, and the alternative syntax element is signaled jointly for the one or more color components.

21. The method of claim 17, wherein the one or more color components includes only one of a luma component, a Cr component, and a Cb component, and the alternative syntax element is signaled individually for the one or more color components.

22. The method of claim 1, further comprising:
  identifying a histogram of luma samples of the current image frame;
  based on the histogram, identifying a luma sample band range for the current image frame, the luma sample band range being defined by a lower luma value threshold and an upper luma value threshold; and
  dividing the luma sample band range into one or more bands of luma values.

23. The method of claim 22, wherein no luma sample of the current image frame has a luma value that is lower than the luma value threshold or higher than the upper luma value threshold.

24. The method of claim 23, wherein a total number of luma samples that are lower than the lower luma value threshold is less than a count threshold, and a total number of luma samples that are greater than the higher luma value threshold is less than the count threshold.

25. The method of claim 1, wherein the video bitstream further includes a first syntax element for a cross-component sample offset (CCSO) mode indicating whether the first sample offset of the first color sample of the current image frame is determined based on one or more luma samples.

26. A computing system, comprising:
  control circuitry; and
  memory storing one or more programs configured to be executed by the control circuitry, the one or more programs further comprising instructions for:
    receiving video data comprising a current image frame and a first syntax element;
    encoding the current image frame;
    based on the first syntax element, determining that the band offset only mode is enabled to determine a first sample offset of a first color sample based on values of one or more luma samples, independently of any associated luma gradient of the one or more luma samples;
    transmitting the encoded current image frame via a video bitstream; and
    signaling, via the video bitstream, the first syntax element to indicate that the band offset only mode is applied to reconstruct the first color sample collocated with a first luma sample based on the first sample offset.

27. A non-transitory computer-readable storage medium storing one or more programs for execution by control circuitry of a computing system, the one or more programs comprising instructions for:
  obtaining a source video sequence including a current image frame; and
  performing a conversion between the source video sequence and a video bitstream, wherein the video bitstream comprises:
    the current image frame; and
    a first syntax element for a band offset only mode indicating whether a first sample offset of a first color sample is determined based on values of one or more luma samples, independently of any associated luma gradient of the one or more luma samples;
  wherein when the band offset only mode is enabled, the first sample offset of the first color sample is determined based on the one or more luma samples including a first luma sample collocated with the first color sample in the current image frame.

* * * * *